(12) United States Patent
Reese et al.

(10) Patent No.: US 7,274,477 B2
(45) Date of Patent: Sep. 25, 2007

(54) PRINTER WITH ACCESS TO REMOTE FILE SYSTEM

(75) Inventors: Curtis Reese, Boise, ID (US); William A. Cox, Melbourne, FL (US); Gregory Nutt, San Jose (CR)

(73) Assignee: Hewlett-Packard Development Company, L.P., Houston, TX (US)

( * ) Notice: Subject to any disclaimer, the term of this patent is extended or adjusted under 35 U.S.C. 154(b) by 978 days.

(21) Appl. No.: 10/350,577

(22) Filed: Jan. 24, 2003

(65) Prior Publication Data

US 2004/0148368 A1   Jul. 29, 2004

(51) Int. Cl.
G06F 3/12 (2006.01)
G06K 1/00 (2006.01)

(52) U.S. Cl. ...................... 358/1.15; 358/1.1
(58) Field of Classification Search ............... 358/1.15, 358/1.1, 1.13, 1.14, 1.18, 500, 400, 401, 358/403, 404
See application file for complete search history.

(56) References Cited

U.S. PATENT DOCUMENTS

| | | | |
|---|---|---|---|
| 5,197,128 A | 3/1993 | Campbell et al. | |
| 5,737,585 A | 4/1998 | Kaneshima | |
| 5,809,287 A * | 9/1998 | Stupek et al. ................. | 703/22 |
| 6,075,617 A | 6/2000 | Fischer et al. | |
| 6,078,402 A | 6/2000 | Fischer et al. | |
| 6,124,938 A | 9/2000 | Rabb et al. | |
| 6,125,372 A | 9/2000 | White | |
| 6,178,003 B1 | 1/2001 | Ha | |
| 6,216,197 B1 | 4/2001 | Rocchetti et al. | |
| 6,253,281 B1 | 6/2001 | Hall | |
| 6,357,021 B1 | 3/2002 | Kitagawa et al. | |
| 6,373,588 B1 | 4/2002 | Fischer et al. | |
| 6,467,087 B1 | 10/2002 | Yang | |
| 6,519,053 B1 * | 2/2003 | Motamed et al. .......... | 358/1.16 |
| 6,864,991 B1 * | 3/2005 | Takahashi .................. | 358/1.15 |
| 2002/0103954 A1 | 8/2002 | Karamanolis et al. | |
| 2003/0093670 A1 * | 5/2003 | Matsubayashi et al. ..... | 713/168 |
| 2003/0133136 A1 * | 7/2003 | Ohishi et al. ................ | 358/1.1 |

* cited by examiner

Primary Examiner—Douglas Q. Tran

(57) ABSTRACT

A printer has access to a remote file system. The printer is configured with a remote file system client module configured to create a logical file system mount to a remote file system. Software, which is configured to operate the printer, is obtained by the printer from the remote file system.

14 Claims, 5 Drawing Sheets

PRINTER WITH ACCESS TO REMOTE FILE SYSTEM

TECHNICAL FIELD

This disclosure relates to printers.

BACKGROUND

The software which operates on a printer is frequently contained on a hardware device such as a ROM (read only memory), and is frequently referred to using the term "firmware." Where a software (i.e. firmware) upgrade is performed, considerable expense in incurred in burning the software into a plurality of ROMs. The exact number of printers to be upgraded may not be known. This may result in the added expense of burning too many ROMs, or may result in the added expense of burning the ROMs in multiple batches. Additionally, in some applications different ROMs must be made for different languages, adding costs due to logistical issues. Moreover, once the ROMs are burned, they are often distributed throughout the region within which the printer has been sold and installed individually in each printer.

Improved ways are needed to provide software upgrades to a printer. Improved ways are also needed to extend the resources of a printer.

BRIEF DESCRIPTION OF THE DRAWINGS

The same reference numbers are used throughout the drawings to reference like features and components.

DETAILED DESCRIPTION

Figure 1:
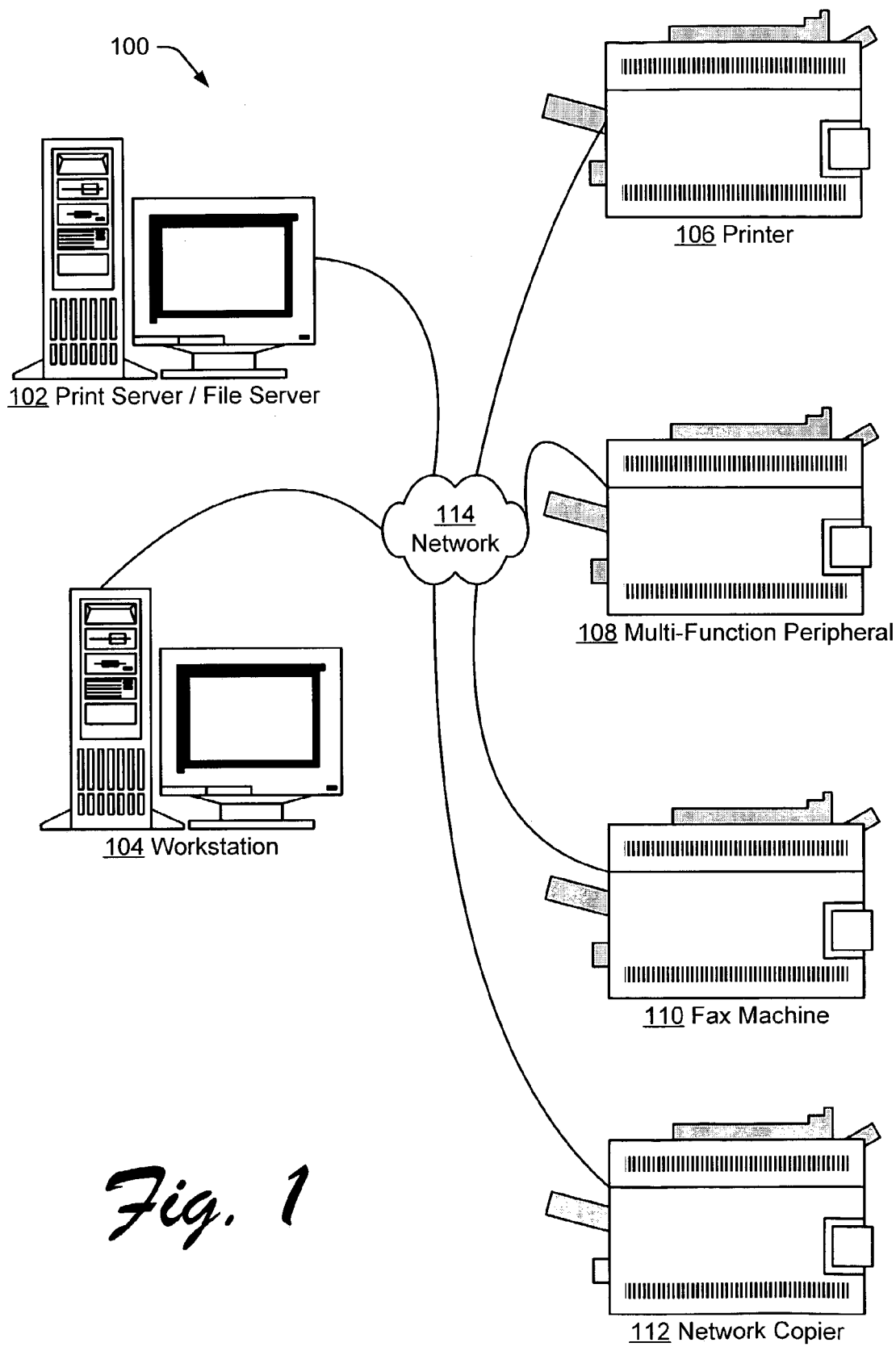
FIG. 1 is an illustration of an exemplary network environment within which a printer's software may be upgraded using a remote file system.

FIG. 1 shows a network environment 100 in which a printer's software may be upgraded using a remote file system. A print server or file server 102 is configured to receive a print job, from any of a plurality of workstations 104. The print job may be sent to any type of printer, such as a printer 106, multifunctional peripheral 108, fax machine 110, network copier 112 or other printing device over a network 114.

Figure 2:
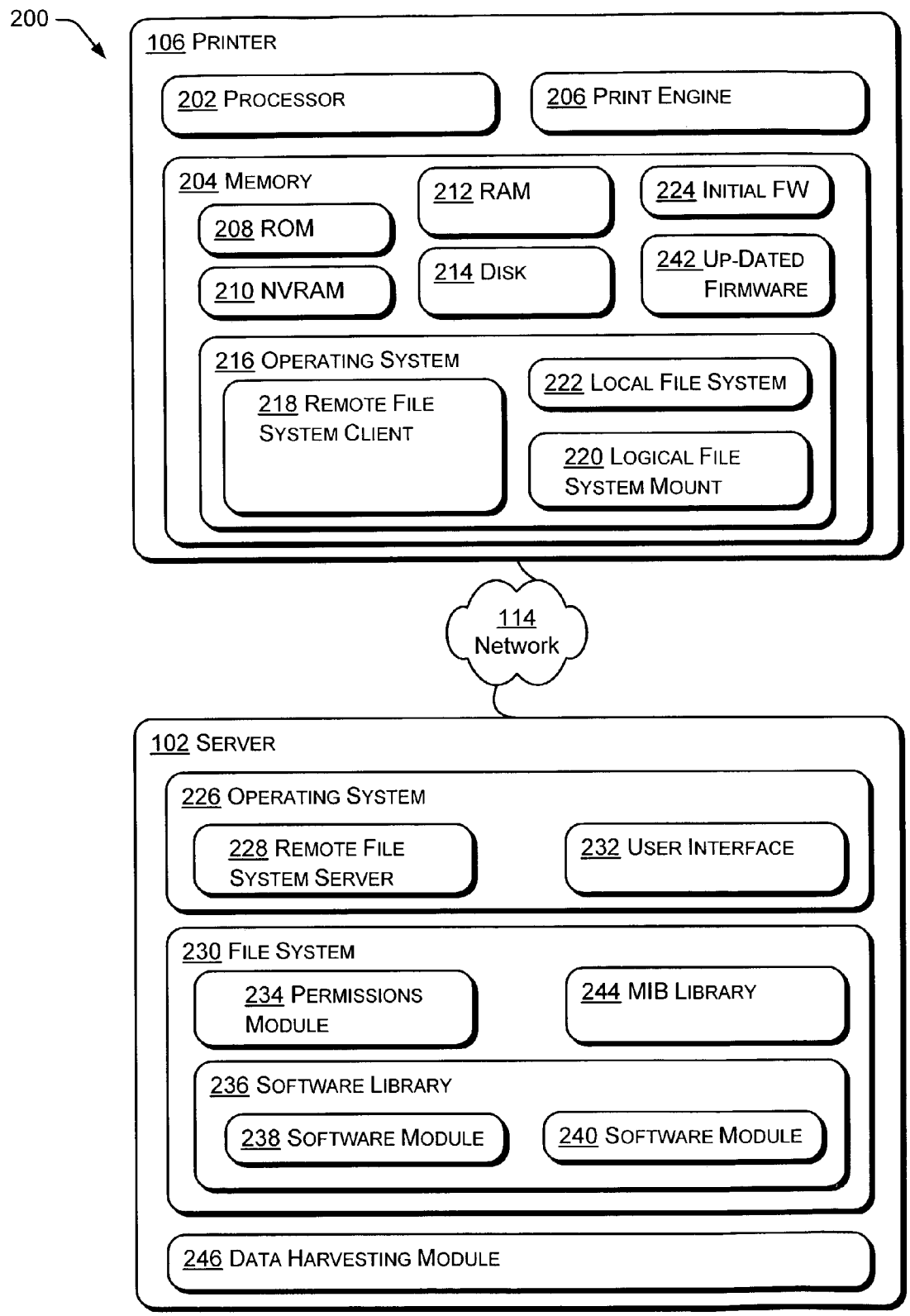
FIG. 2 is a block diagram that illustrates the components described in an exemplary implementation.

FIG. 2 is a block diagram that illustrates components included in an exemplary implementation of a system 200 within which a printer 106 receives software or a software upgrade from a remotely located file system 230. The printer 106 or other output device is configured to communicate with the print server 102 over the network 114. The printer 106 includes a processor 202, memory 204 and a print engine 206. The memory may include one or more devices, such as ROM 208, NVRAM (non-volatile random access memory) 210, RAM 212 and a disk drive 214.

Software code constituting an operating system 216 is executed by the processor 202 and is stored within the memory 204. The operating system 216 includes a remote file system client module 218, which supports communication with the remotely located file system 230. Examples of such remote file system client modules 218 include a Network File System (NFS) client module, Microsoft's networking products or similar software modules. The remote file system client module 218 allows the printer 106 to logically mount a remotely located file system 230. The information that enables the client module 218 to logically mount the server file system 230 is the logical file system mount 220.

Upon logically mounting the file system 230, the operating system 216 may communicate with the file system 230 in a transparent manner, i.e. as if the file system 230 was locally located. Therefore, by using the remote file system client module 218 and logical file system mount information 220, the printer 106 is able to access files stored within the remote file system 230 that are located in a physically remote location, such as on print server 102. In some implementations, a local file system 222 may also be present, particularly where the printer 106 is configured with the optional disk drive 214. An initial software or firmware module 224 may include some or all of the software functionality contained within the printer 106, including the operating system 216.

The print server 102 includes an operating system 226 which includes a remote file system server module 228. Examples of such remote file system server modules include a Network File System (NFS) server module, Microsoft's networking products or similar software modules. The remote file system server 228 on the print server 102 operates in concert with the remote file system client 218 on the printer 106 to enable the printer 106 to logically mount the file system 230.

In some implementations, a user interface 232 is supported by the operating system 226 of the print server 102. Such a user interface 232 may be configured in a manner similar to Internet browser software, thereby allowing an administrator to gain access to the printer 106 over the network 114. Once in communication with the printer 106, the user interface 232 would allow the administrator to configure the printer 106 to logically mount the file system 230. Such configuration may include identification of a specific remote file system server by a TCP/IP address and/or a host name. And further, the user interface 232 may allow an administrator to adjust a permissions module 234, which is typically located on the print server 102 or other remote location. In doing so, the administrator is able to control read/write permissions of various files and/or folders within the file system 230, allowing the printer 106 to have read-only or read/write permission to only selected files.

A software library 236 is contained within the file system 230 which may be located on the print server 102. The printer 106 may access the software 236 via the logical mount of the file system 230. The software library 236 may contain at least one software and/or firmware module such as software modules 238 and 240. Each software module 238, 240 is configured to operate a printer 106-112 or other output device. The software modules 238, 240 may include signature files, fonts, e-forms (e.g. IRS documents wherein fields may be entered within a form), documents supporting services as well as executable code supporting the operation of a printer, such as an operating system and applications. Accordingly, the modules 238, 240 may be used as a replacement or up-grade to firmware and/or software module 224 used to operate the device 106-112. For example, one of the modules 238, 240 could be assigned permissions by the permission module 234 to allow the printer 106 to read the file (i.e. the module 238 or 240) via the logical file system mount of file system 230.

Via the logical file system mount of the file system 230, for example, the printer 106 can retrieve software modules 238 and 240 to replace initial firmware 224 with an updated firmware module 242. The updated firmware module 242 is a copy of the appropriate module 238, 240.

A MIB (management information base) library 244 may be located within the file system 230. The MIB library 244 can be configured to include a MIB associated with each of a plurality of printers 106, such as the plurality of printers serviced by the print server 102. Each printer may be configured to access its MIB within the MIB library 244 via the logical file system mount 220 supported by the remote file system client software 218.

By using a MIB within the MIB library 244, each printer 106 avoids the need to allocate NVRAM or disk space for a MIB. Thus, instead of writing printer information—such as the number of print jobs and pages completed—to a MIB located on the printer, the printer would write to a MIB located on the remote file system 230 using the logical file system mount 220 supported by remote file system software 218, 228.

A data harvesting module 246 is typically located remote from the printer 106, and may be located on the print server 102 or other convenient location. The data harvesting module 246 is configured to perform "MIB walks," during which data related to the operation of one or more printers is obtained. Such data is typically related to the number of print jobs, the number of pages printed, the amount of toner used and other information.

The firmware modules 224, 242 may include multiple copy making software for making multiple copies of a single document, or may include duplex printing software for duplex (i.e. two-sided) printing. As will be seen in greater detail in FIG. 5, these printing operations may require storage space for compressed data associated with one or more pages. Accordingly, the remote file system server/client 228, 218 assists the multiple copy making software and the duplex printing software by providing storage space needed to perform these operations.

Figure 3:
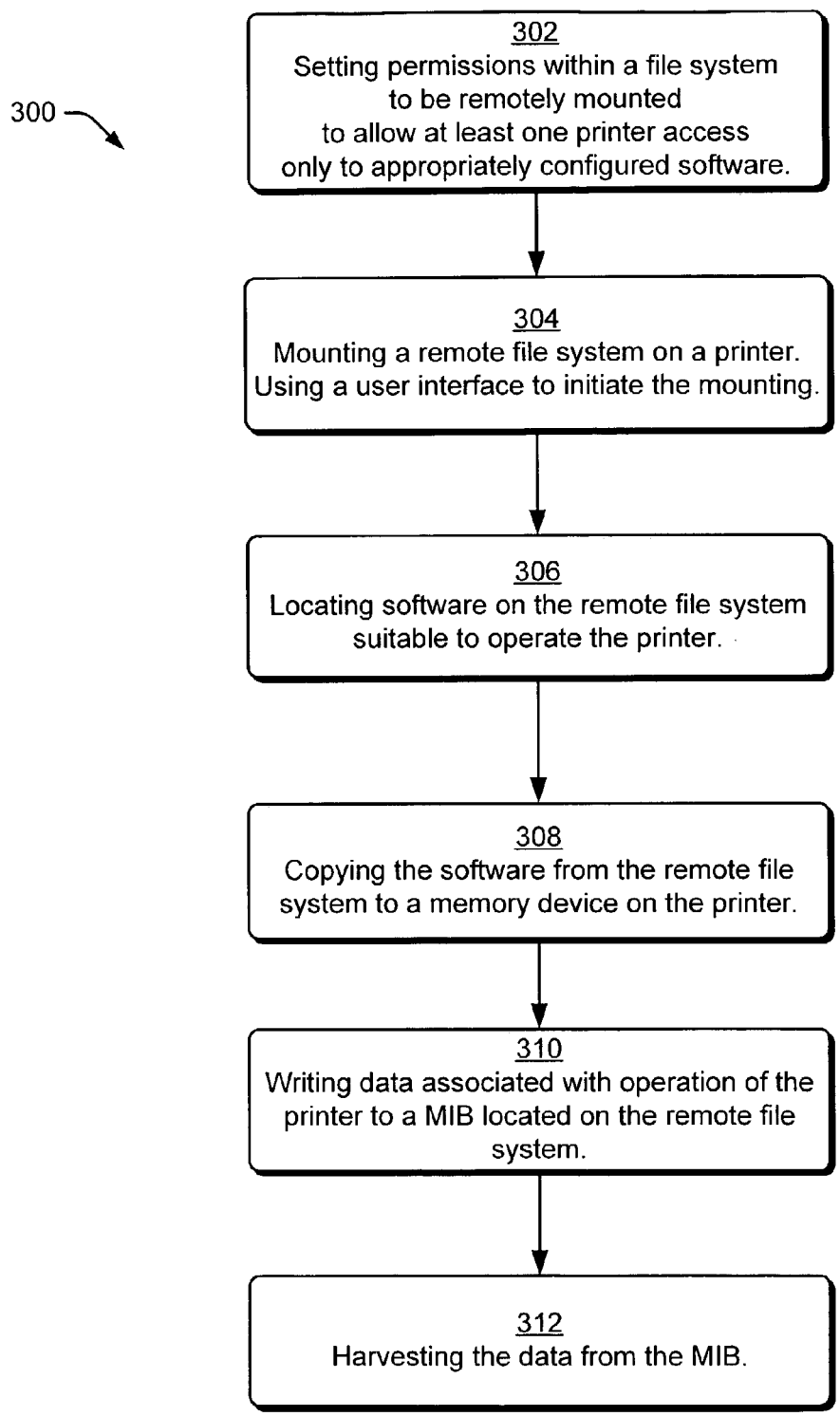
FIG. 3 is a flow diagram that describes an exemplary method to upgrade a printer's software using a remote file system.

The flow chart of FIG. 3 illustrates an implementation of an exemplary method 300 for upgrading a printer's software using a remote file system. The elements of the method may be performed by any desired means, such as by the execution of processor-readable instructions defined on a processor-readable media, such as a disk, a ROM or other memory device. Also, actions described in any block may be performed in parallel with actions described in other blocks, may occur in an alternate order, or may be distributed in a manner which associates actions with more than one other block.

At block 302, permissions are set within the file system 230 to be remotely mounted to allow at least one printer access only to appropriately configured software. For example, where a given type of printer requires a given type of software, permissions would be set to allow that printer to access that software, but permissions would not be set to allow access to software not configured for the printer's correct operation.

At block 304, the remote file system client 218 logically mounts the file system 230 on the printer 106 so that the printer 106 can access at least portions of the remotely located file system 230 for which permissions are available.

Typically, the mounting process—which may include the creation and configuration of the logical file system mount 220 in RAM 212—is performed automatically during the boot-up of the printer. Alternatively, where a user interface 232 on the server 102 is used to allow an administrator to communicate with the printer 106, the user interface 232 may allow a user to initiate and/or direct the mounting process.

At block 306, software 238, 240 is located, by the printer 106, on the remote file system 230. The software 238, 240 is suitable to operate the printer 106. The locating may be performed automatically, such as by the operating system 216 or by firmware 224 on the printer. Alternatively, an administrator operating the user interface 232 on the print server 102 or other networked device may locate the desired software.

At block 308, appropriate files and software 238, 240, or portions thereof, are copied from the remotely located file system 230 to memory 204 on the printer 106. The copying process may be facilitated by use of the remote file system server/client modules 228, 218, which allows the printer 106 to obtain files from the logically mounted file system 230. The copying process may be performed automatically at the time of printer boot-up, to provide the software needed for printer operation. Accordingly, the printer may not require non-volatile memory devices to contain the software when the printer is turned off. Alternatively, where a user interface 232 was utilized, the copying process may be initiated by an administrator operating the user interface 232. In the copying process, the initial firmware or software 224 (if present) may be over-written by the up-dated firmware or software 242. In this case, the copying process is typically performed only if the up-dated software 242 is actually newer or different than the initial software 224. Thus, in some cases, the initial software 224 may not provide full printer functionality. As a solution, the up-dated software 242 is obtained to provide that functionality.

At block 310, data associated with the operation of the printer 106 is written by the printer (via the logical mount of the file system 230) to a MIB, typically located within a MIB library 244. The data may include such information as the number of print jobs performed, the number of pages printed, the amount of toner used and other information.

At block 312, data is harvested from one or more MIBs, contained within the MIB library 244 containing one or more MIBs. The data harvesting may be performed in conjunction with a printer servicing routine, and may be performed by a data harvesting module 246 or similar software module which may be contained on the print server 102 or other location. At regular intervals, the MIB library 244 and/or the entire file system 230 may be backed up (i.e. copied), and copies stored in accordance with a software and data maintenance and protection program.

Figure 4:
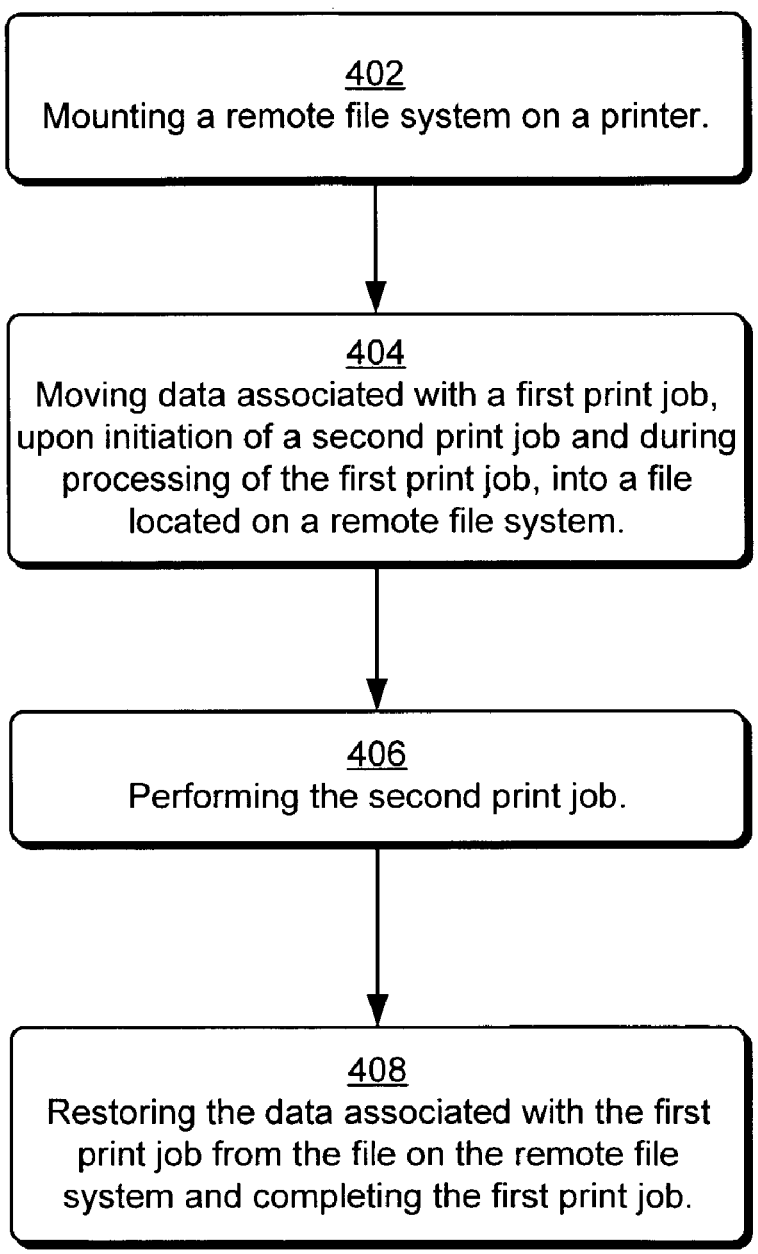
FIG. 4 is a flow diagram that describes an exemplary method to alternate between print jobs assisted by a remote file system.

The flow chart of FIG. 4 illustrates an implementation of an exemplary method 400 for alternating between print jobs (i.e. "hot-swapping" of jobs) assisted by a remote file system logically mounted on a printer. By providing memory space needed for processing the print jobs, the remote file system assists in the alternation between printing jobs. The elements of the method may be performed by any desired means, such as by the execution of processor-readable instructions defined on a processor-readable media, such as a disk, a ROM or other memory device. Also, actions described in any block may be performed in parallel with actions described in other blocks, may occur in an alternate order, or may be distributed in a manner which associates actions with more than one other block.

At block 402, the remote file system 236 is logically mounted on the printer 106, thereby providing the printer access to the remote file system 230. At block 404, as printer 106 is printing a first print job, a second print job, having higher priority than the first print job is initiated. Work on the first print job is suspended, and data associated with the first print job is moved into one or more files located on the remote file system 230. Accordingly, resources within the printer 106 are better able to handle the second print job.

At block 406, the second print job is processed, while the processing of the first print job is suspended. At block 408, upon completion of the second print job, the data associated with the first print job is restored from the file or files on the remote file system 230. The processing of the first print job is then completed.

Figure 5:
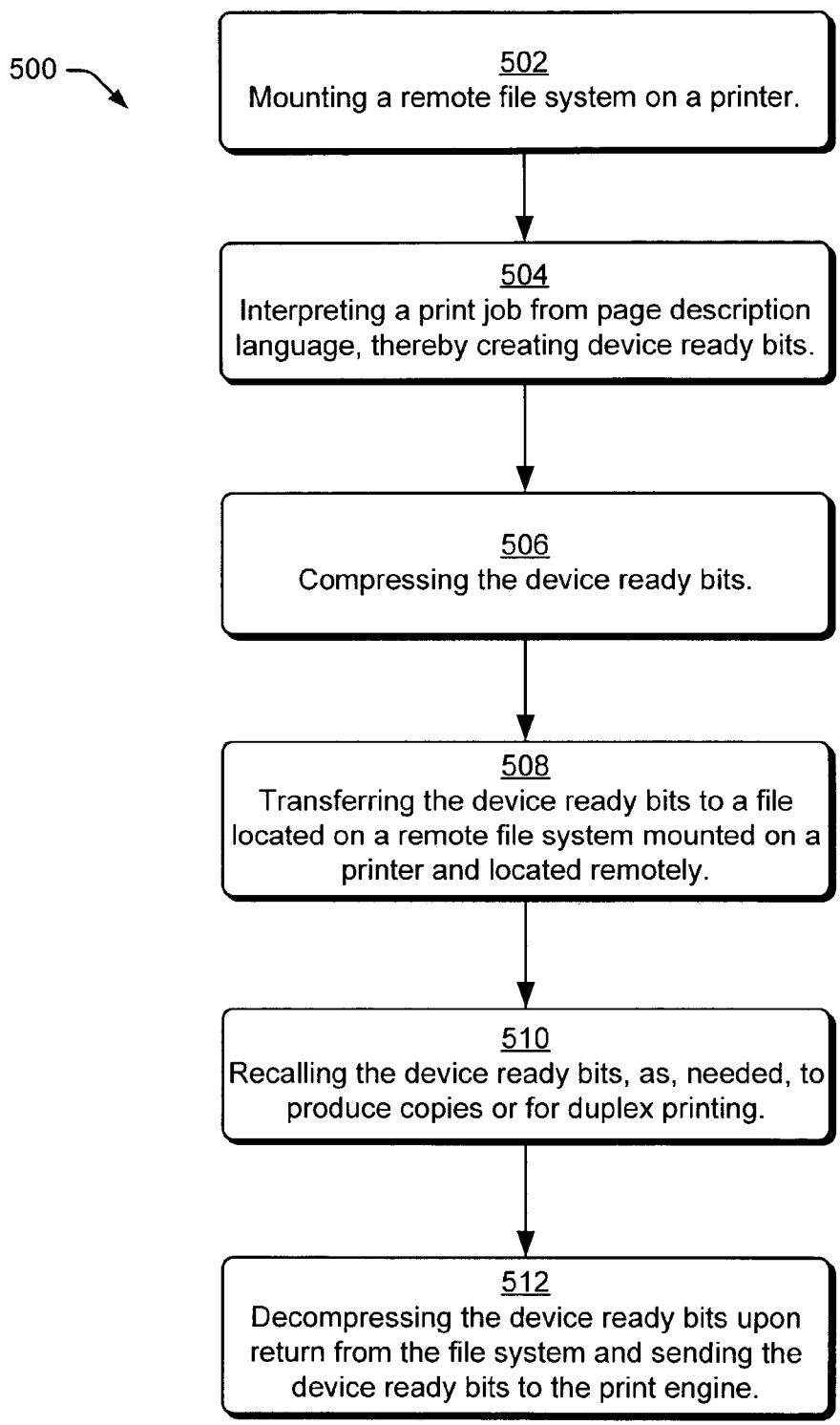
FIG. 5 is a flow diagram that describes an exemplary method to print copies of a print job assisted by a remote file system.

The flow chart of FIG. 5 illustrates an implementation of an exemplary method 500 for printing multiple copies of a print job assisted by memory space available on a remote file system. Such software may be referred to as multiple page copy software. Similarly, the method supports duplex printing that may be assisted by memory available on the remote file system 230. In particular, in some applications the second page of a duplex page is printed first, thereby requiring storage of data related to one or both pages. The required storage for one or both pages may be provided by the remote file system 230. The elements of the method may be performed by any desired means, such as by the execution of processor-readable instructions defined on a processor-readable media, such as a disk, a ROM or other memory device. Also, actions described in any block may be performed in parallel with actions described in other blocks, may occur in an alternate order, or may be distributed in a manner which associates actions with more than one other block.

At block 502, the printer 106 logically mounts the file system 230.

At block 504, a page of a print job is interpreted from a page description language, thereby creating device ready bits to drive the print engine 206 in a manner to produce an output image of the page. At block 506, the device ready bits associated with the page are typically compressed. At block 508, the logically mounted file system 230 assists the printing job by providing memory space. In one example, the device ready bits for the page are transferred to a file(s) located on the remote file system 230, where storage is typically more available than it is on the printer 106-112. The data sent to the remote file system 230 may be associated with a multiple page copy print job, or may be associated with a duplex print job.

At block 510, the device ready bits are recalled, i.e. transferred back to the printer 106-112, one or more times to print one or more additional copies of the page or to print a page of a duplex print job. At block 512, after arriving at the printer, the device ready bits are decompressed and sent to the print engine.

Although the disclosure has been described in language specific to structural features and/or methodological steps, it is to be understood that the appended claims are not limited to the specific features or steps described. Rather, the specific features and steps are exemplary forms of implementing this disclosure. For example, while the physical location of the remote file system 230 has been described for purposes of illustration as the print server 102, the remote file system 230 could be physically located at any desired location. Also, while reference to printer 106 has been made in many instances, any type of printer, such as output devices 108-112 could be substituted.

Additionally, while one or more methods have been disclosed by means of flow charts and text associated with the blocks, it is to be understood that the blocks do not necessarily have to be performed in the order in which they were presented, and that an alternative order may result in similar advantages.

The invention claimed is:

1. A printer, comprising:
    a remote file system client module configured to enable the printer to logically mount a remote file system;
    software, configured to operate the printer, obtained from the logically mounted remote file system;
    memory;
    wherein the software is stored in the memory; and
    wherein the printer is configured to utilize the logically mounted remote file system for storing print data while executing the software.

2. The printer of claim 1, additionally comprising:
    multiple copy software, included in the software, to facilitate printing of multiple copies of a print job.

3. The printer of claim 1, additionally comprising:
    duplex printing software, included in the software, to facilitate duplex printing.

4. The printer of claim 1, wherein the printer is configured to automatically obtain the software upon printer boot-up.

5. The printer of claim 1, wherein the file system mount is an NFS mount.

6. A system, comprising:
    a printer and;
    a server including a file system;
    wherein the printer is connected to the server over a network system and;
    wherein the printer logically mounts the file and
    wherein the printer uses the logically mounted file system to temporarily store print data while processing a print job.

7. The system of claim 6, wherein the logically mounted file system includes a printer firmware upgrade; and wherein the printer is configured to obtain the upgrade from the logically mounted file system as the printer boots up.

8. The system of claim 6, wherein the printer is configured to communicate with a MIB located on the logically mounted file system.

9. The system of claim 8, additionally comprising:
    a data harvesting module remote from the printer, configured to obtain data from the MIB.

10. The system of claim 6, wherein the printer includes memory and;
    wherein the server includes a user interface configured to initiate, under use movement of software from the logically mounted file system to the printer memory.

11. The system of claim 6, wherein the logical mount is an NFS mount.

12. A processor-readable medium comprising processor-executable instructions for hot-swapping jobs during operation of a printer, the processor-executable instructions comprising instructions for:
    moving data associated with a first print job, upon initiation of a second print job and during processing of the first print job, into a remote file system;
    performing the second print job;
    restoring the data associated with the first print job from the remote file system and completing the first print job and;
    wherein the remote file system is logically mounted on the printer;

wherein the remote file system is located on a computing device that is connected to the printer over a network.

13. A processor-readable medium comprising processor-executable instructions for performing multiple copy jobs, the processor-executable instructions comprising instructions for:
   interpreting a print job from page description language, thereby creating device ready bits;
   transferring the device ready bits, via a logical file system mount on a printer, to a remote file system and;
   recalling the device ready bits, as needed, to produce copies.

14. A processor-readable medium as recited in claim 13, comprising further instructions for:
   compressing the device ready bits prior to transfer to the remote file system and;
   decompressing the device ready bits upon return from the remote file system.

* * * * *

UNITED STATES PATENT AND TRADEMARK OFFICE
CERTIFICATE OF CORRECTION

PATENT NO. : 7,274,477 B2  Page 1 of 1
APPLICATION NO. : 10/350577
DATED : September 25, 2007
INVENTOR(S) : Curtis Reese et al.

It is certified that error appears in the above-identified patent and that said Letters Patent is hereby corrected as shown below:

In column 6, line 29, in Claim 6, delete "printer and;" and insert -- printer; and --, therefor.

In column 6, line 32, in Claim 6, delete "system and;" and insert -- system; --, therefor.

In column 6, line 33, in Claim 6, after "file" delete "and" and insert -- system; and --, therefor.

In column 6, line 49, in Claim 10, delete "memory and;" and insert -- memory; and --, therefor.

In column 6, line 51, in Claim 10, after "under" delete "use" and insert -- user direction, --, therefor.

In column 6, lines 64-65, in Claim 12, after "print" delete "job and;" and insert -- job; and --, therefor.

In column 7, line 10, in Claim 13, delete "system and;" and insert -- system; and --, therefor.

In column 8, line 6, in Claim 14, delete "system and;" and insert -- system; and --, therefor.

Signed and Sealed this

Thirty-first Day of August, 2010

David J. Kappos
*Director of the United States Patent and Trademark Office*